United States Patent
Esser et al.

(10) Patent No.: US 10,443,722 B2
(45) Date of Patent: Oct. 15, 2019

(54) DEVICE FOR PREVENTING INADVERTENT SELECTION OF A PARKING LOCK FUNCTION IN A TRANSMISSION

(71) Applicant: Dr. Ing. h.c. F. Porsche Aktiengesellschaft, Stuttgart (DE)

(72) Inventors: Joachim Esser, Rutesheim (DE); Hans-Jürgen Renk, Rastatt-Plittersdorf (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 426 days.

(21) Appl. No.: 15/378,333

(22) Filed: Dec. 14, 2016

(65) Prior Publication Data
US 2017/0175890 A1    Jun. 22, 2017

(30) Foreign Application Priority Data
Dec. 17, 2015 (DE) .......................... 10 2015 122 085

(51) Int. Cl.
*F16H 63/34*   (2006.01)
*F16H 61/18*   (2006.01)
(Continued)

(52) U.S. Cl.
CPC ..... *F16H 63/3416* (2013.01); *F16H 61/0059* (2013.01); *F16H 61/18* (2013.01);
(Continued)

(58) Field of Classification Search
CPC ................ F16H 61/0059; F16H 61/18; F16H 2061/185; F16H 63/04; F16H 63/18;
(Continued)

(56) References Cited

U.S. PATENT DOCUMENTS

| 7,621,387 B2 * | 11/2009 | Lin ........................ F16H 63/48 192/219.4 |
| 9,440,625 B2 | 9/2016 | Marklen |
| 2015/0260285 A1 | 9/2015 | Buender |

FOREIGN PATENT DOCUMENTS

| DE | 102013107860 | 1/2015 |
| DE | 102014103523 | 9/2015 |
| DE | 102014115371 | 4/2016 |

OTHER PUBLICATIONS

German Search Report for German Application No. 10 2015 122 085.7, dated Sep. 23, 2016 with partial translation, 7 pages.

* cited by examiner

*Primary Examiner* — Richard M Lorence
(74) *Attorney, Agent, or Firm* — RatnerPrestia

(57) ABSTRACT

A device and method for preventing inadvertent selection of a parking lock function in a 2-ratio transmission. Here, the shift positions of the transmission and the parking lock function thereof can be selected by way of a shift drum. A mechanically acting apparatus is provided which, in the event of rotation of the shift drum in a first direction of rotation, blocks the selection of a parking lock position of the shift drum, subsequently, in the event of rotation of the shift drum in a second direction of rotation opposite to the first direction of rotation, releases the blocking, and subsequently, in the first direction of rotation opposite to the second direction of rotation, permits selection of the parking lock position. The device does not require a separate parking lock wheel.

15 Claims, 2 Drawing Sheets

(51) Int. Cl.
  *F16H 63/04* (2006.01)
  *F16H 63/38* (2006.01)
  *F16H 61/00* (2006.01)
  *F16H 63/18* (2006.01)
  *B60K 1/00* (2006.01)

(52) U.S. Cl.
  CPC ............ *F16H 63/04* (2013.01); *F16H 63/18* (2013.01); *F16H 63/38* (2013.01); *B60K 1/00* (2013.01); *B60K 2001/001* (2013.01); *B60Y 2200/91* (2013.01); *B60Y 2200/92* (2013.01); *F16H 2061/185* (2013.01); *F16H 2200/0034* (2013.01)

(58) Field of Classification Search
  CPC ................. F16H 63/3416; F16H 63/38; F16H 2200/0034; B60K 1/00; B60K 2001/001; B60T 1/005; B60T 1/06; B60Y 2200/91; B60Y 2200/92; Y10T 74/19251; Y10T 74/19279
  USPC ........................................... 192/219.4, 219.5
  See application file for complete search history.

DEVICE FOR PREVENTING INADVERTENT SELECTION OF A PARKING LOCK FUNCTION IN A TRANSMISSION

CROSS-REFERENCE TO RELATED APPLICATION

This application claims priority to German Patent Application No. DE 10 2015 122 085.7, filed Dec. 17, 2015, which is incorporated by reference herein in its entirety.

FIELD OF THE INVENTION

The invention relates to a device for preventing inadvertent selection of a parking lock function in a 2-ratio transmission. A transmission of said type forms, for example, a part of an electrically driveable axle of a motor vehicle, in particular of a passenger motor vehicle.

BACKGROUND OF THE INVENTION

In the case of transmissions, it is normally the case that the parking lock function is realized by way of the interaction of a parking lock wheel with a locking bolt. When the vehicle is stationary, the parking lock can be engaged, wherein the bolt engages into the parking lock wheel and locks the transmission.

SUMMARY OF THE INVENTION

It is an object of the present invention to provide a device for preventing inadvertent selection of a parking lock function in a 2-ratio transmission, which device requires no separate parking lock wheel.

The object is achieved by way of a device for preventing inadvertent selection of a parking lock function in a 2-ratio transmission, wherein shift positions of the transmission and the parking lock function of said transmission can be selected by way of a shift drum, wherein a mechanically acting apparatus is provided which, in the event of rotation of the shift drum in a first direction of rotation, blocks the selection of a parking lock position of the shift drum, subsequently, in the event of rotation of the shift drum in a second direction of rotation opposite to the first direction of rotation, releases the blocking, and subsequently, in the first direction of rotation opposite to the second direction of rotation, permits selection of the parking lock position.

In the case of this 2-ratio transmission, the shift positions of the transmission and the parking lock function of said transmission can be selected by way of a shift drum. A mechanically acting apparatus is provided which, in the event of rotation of the shift drum in a first direction of rotation, blocks the selection of a parking lock position of the shift drum, subsequently, in the event of rotation of the shift drum in a second direction of rotation opposite to the first direction of rotation, releases the blocking, and subsequently, in the first direction of rotation opposite to the second direction of rotation, permits selection of the parking lock position.

Owing to said device, it is the case, upon actuation of a clutch of the 2-ratio transmission, in particular upon actuation of a shift clutch for the engagement of the first ratio of the transmission, the inadvertent selection of the parking lock position owing to incorrect operation of an actuator is prevented by way of the shift drum. This prevents the transmission from being able to lock up during travel. The position of clutches of the transmission is in this case controlled for example by way of a correspondingly shaped slotted guide on the shift drum.

Thus, a mechanical apparatus is proposed which, in a manner dependent on the movement direction or direction of rotation of the shift drum, initially prevents the selection of a certain shift drum position by way of a blockage, in particular a positively locking blockage, which can be activated by virtue of a certain position being passed over. A release of the shift drum for the purposes of attaining the initially blocked position is realized in that the shift drum must initially be moved backward from the blocked position through a certain travel or angle, and in the process, enables the parking lock function by way of a passing-over action.

For the shifting of the two ratios of the transmission, provision is made in particular of the clutch and furthermore of a shift claw, wherein the latter may additionally be assigned a freewheel. In particular, it is provided that, in the second drive ratio, the clutch is closed and the shift claw is opened, whereas in the first ratio, during traction operation of the vehicle and when the transmission is in the neutral position, both the clutch and the shift claw are each situated in their open position. During driving operation in the first ratio, wherein overrun operation must also be taken into consideration here, the clutch is situated in its opened position, and the shift claw is situated in its closed position. If the shift drum is rotated further in order to move it from the position of the second ratio via the position of the first ratio into the parking lock position, a shift state must be generated in which both the clutch and the shift claw are closed. For safety reasons, said parking lock position of the shift drum must not be inadvertently selected under any circumstances, in particular by way of the shift drum being rotated further beyond the first ratio in the direction of the parking lock position. This is prevented by way of a mechanically acting apparatus provided in the device.

In a preferred exemplary embodiment, the apparatus has two base parts which are movable relative to one another, and also a flexible first stop which is mounted in one, the first, base part, and second and third stops which are mounted in the other, second, base part. Here, the second stop is mounted in the second base part so as to be displaceable to a limited extent in the directions of relative movement of the base parts. The third stop is displaceable, perpendicularly to the directions of relative movement of the base parts, in the direction of the first base part and oppositely thereto. In the event of relative movement of the two base parts, the second stop is moved to a limited extent by way of the first stop, and in the process, said second stop deploys the third stop in the direction of the first base part. This takes place in such a way that, after limited movement of the second stop in the direction of the third stop, in the event of a further relative movement of the two base parts, the second stop can be passed over by the first stop, and the third stop cannot be passed over by the first stop. By virtue of the fact that the third stop is deployed and cannot be passed over by the first stop, the two base parts are prevented from being able to move relative to one another to such an extent, in particular from being able to rotate relative to one another to such an extent, that the shift drum is rotated into the parking lock position.

In this context, it is considered to be particularly advantageous if the second stop has a projection which, during the movement of the second stop in the direction of the third stop, deploys the third stop in the direction of the first base part. Said projection is in particular designed so as to taper conically in the direction of the third stop, such that, as the second stop and third stop move closer together, the third stop is deployed in continuous fashion.

It is also considered to be advantageous if spring means are provided for preloading the third stop into its retracted position. Thus, the third stop is deployed only when the second stop or the projection of the second stop acts on the third stop. If the action of the second stop on the third stop is withdrawn, the spring means cause the third stop to be retracted in accordance with the second stop now no longer acting on the third stop to this extent.

From the aspect of the preferred design of the apparatus, it is considered to be particularly expedient if, at the time at which the first stop is situated between the second stop and the third stop, in the event of a movement of first stop and second stop toward one another, the second stop is pushed back to a limited extent, and the second stop releases the third stop, whereby the third stop retracts.

In particular, when the second stop has been pushed back and the third stop retracted, the third stop can be passed over by the first stop for the purposes of attaining the parking lock position of the shift drum.

The shift positions of the transmission, in particular of the first transmission ratio, can be attained again in uncomplicated fashion proceeding from the parking lock position. For this purpose, it is merely necessary, proceeding from the parking lock position of the shift drum, for the retracted third stop and the second stop to be passed over by the first stop. A shift position of the transmission, in particular initially the shift position of the first transmission ratio, can be attained in this way.

It is considered to be particularly advantageous if the first base part is a constituent part of the shift drum or is connected rotationally conjointly to the shift drum, and if the second base part is static. The first stop is thus a constituent part of the shift drum or connected rotationally conjointly to the shift drum.

The flexible first stop that is mounted in the first base part is in particular in the form of a spring pin. Said pin is in particular straight when in its rest position, that is to say in the case of a non-deflected spring, wherein the spring pin or the spring is deflected in curved fashion when it yields.

Further features of the invention will emerge from the appended drawing and from the description of the preferred exemplary embodiment depicted in the drawing, without the invention being restricted thereto.

DETAILED DESCRIPTION OF THE INVENTION

Figure 1:
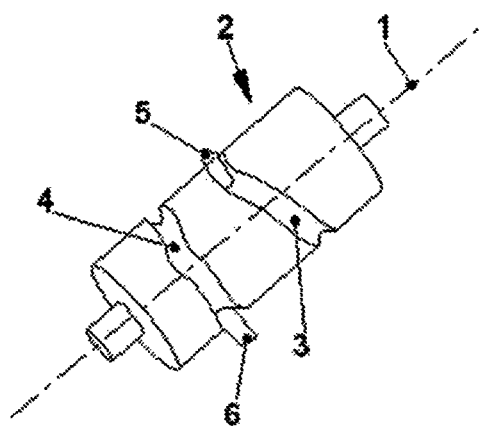
FIG. 1 shows, in a three-dimensional illustration, a shift drum, which forms a constituent part of the device according to aspects of the invention, for use with a 2-ratio transmission.

FIG. 1 shows a shift drum 2 which is rotatable about an axis 1 and which serves for the actuation of a 2-ratio transmission as part of an electrically driveable axle of a motor vehicle, in particular of a passenger motor vehicle. Said shift drum 2 has two slotted guides 3, 4, wherein in each case one shift pin 5 and 6 respectively engages into the associated slotted guide 3 and 4. The shift pin 5 serves for the actuation of a clutch, for example of a frictionally acting clutch. The shift pin 6 serves for the actuation of a further clutch, which is in the form of a shift claw. The frictionally acting clutch serves as a shift element for the second transmission ratio. The shift claw, which interacts with a freewheel, serves as shift element for the first transmission ratio. The freewheel acts only in one direction of rotation.

Figure 2:
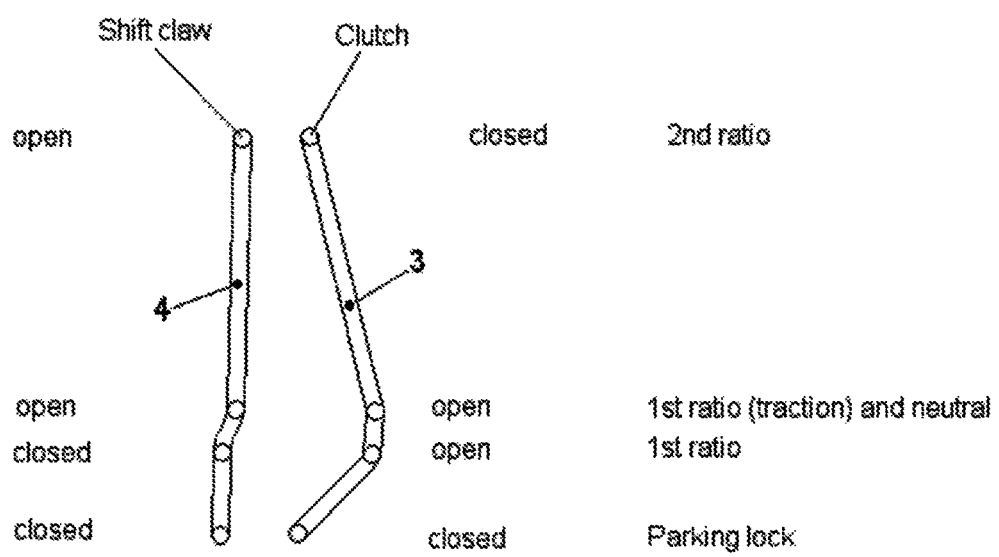
FIG. 2 shows a diagram illustrating the developed view of the slotted guide arrangements of the shift drum for the shifting of the transmission ratios and of the parking lock function.

FIG. 2 shows the shift states of frictionally acting clutch and shift claw. In the second transmission ratio, the frictionally acting clutch is situated in its closed position, and the shift claw is situated in its opened position. During traction operation in the first ratio, and when the transmission is in the neutral position, both the frictionally acting clutch and the shift claw are situated in their opened positions. In the first ratio, and thus also taking into consideration overrun operation, the frictionally acting clutch is situated in its opened position, and the shift claw is situated in its closed position. When the parking lock is engaged, and thus in the parking lock position of the shift drum, both the frictionally acting clutch and the shift claw are situated in their closed position. Said parking lock position of the shift drum 2 must not be inadvertently selected under any circumstances, in particular while the vehicle is in motion, because, in said position, the transmission as a whole is locked up. From this aspect, the apparatus for limiting the travel of the shift drum 2 will be described below, proceeding from the first ratio into the parking lock position of the shift drum 2.

Figure 3:
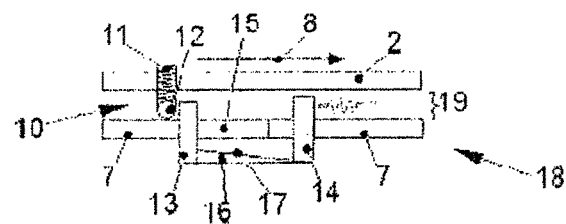
FIG. 3 is a schematic illustration of the mechanically acting apparatus provided in the device for the purposes of limiting the shift drum travel, illustrated in an initial position of the shift drum corresponding to the engaged first transmission ratio.

FIG. 3 shows, in greatly simplified form, a subregion of the shift drum 2, wherein the rotational movement of the shift drum 2 is indicated by a rectilinear movement as per arrow 8. A static part 7, for example a housing part, is arranged so as to be situated opposite the shift drum 2. The shift drum 2 can thus be moved relative to the static part 7 in the direction of the arrow 8 and oppositely, as per the arrow 9. A flexible first stop 10 is mounted in the shift drum 2. Said first stop is in the form of a spring pin, which has a spiral spring 11 mounted in the shift drum 2 and a stop ball 12 connected to said spiral spring. The spiral spring 11 is directed toward the static part 7, and the stop ball 12 connected to the spiral spring 11 is arranged with a small spacing to the static part 7. A second stop 13 and a third stop 14 are mounted in the static part 7. The second stop 13 extends through a guide slot 15 in the static part 7, wherein said guide slot 15 is oriented in the direction of the arrows 8, 9. The second stop 13 can thus be displaced in the direction of the arrows 8, 9 to a limited extent owing to the length of the guide slot 15. The third stop 14 is mounted in the static part 7 so as to be displaceable exclusively perpendicular to the direction of the arrows 8, 9, toward and away from the shift drum 2. The second stop 13 is equipped with a projection 16 which, proceeding from that region of the second stop 13 which is mounted in the static part 7, narrows conically toward the third stop 14. That surface 17 of the projection 16 which faces toward the static part 7 therefore does not run parallel to the static part 7. The illustration does not show spring means which act on the third stop 14 such that the third stop 14 is pressed against the surface 17 of the projection 16. The apparatus 18 described thus far and shown in FIG. 3 serves for limiting the travel of the shift drum 2 when the transmission is to be transferred into its parking lock function.

Figure 4:
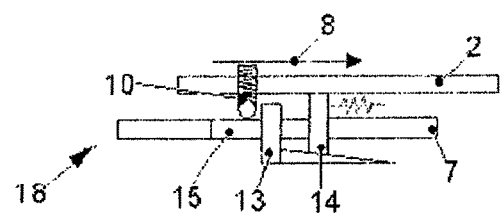
FIGS. 4, 5, 6, 7 and 8 show function sequences for the selection of the parking lock position of the shift drum proceeding from the state as per FIG. 3.

FIG. 3 shows that, when the first transmission ratio is engaged, the first stop 10 is arranged on that side of the second stop 13 which is averted from the third stop 14. In the position shown, the second stop 13 and the third stop 14 do not extend over the spacing dimension 19 between shift drum 2 and static part 7, but only over a part of said spacing dimension. If, in order to attain the parking lock function of the transmission, the mechanically acting apparatus 18 is to be activated, the shift drum 2 is rotated out of the shift position of the first transmission ratio in the direction of the parking lock position of the shift drum 2, whereby, with regard to the illustrated drawing, the first stop 10 moves against the second stop 13 and pushes the latter forward in the direction of the third stop to the end of the guide slot 15. Here, the inclined surface 17 causes the third stop 14 to be pushed out until it makes contact with the shift drum 2 (FIG. 4).

Figure 5:
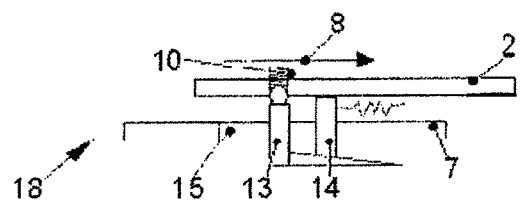

As the second stop 13 is pushed forward further, the spiral spring 11 is compressed, such that the stop ball 12 of the first stop 10 makes contact with the second stop on its side facing toward the shift drum 2 (FIG. 5).

Figure 6:
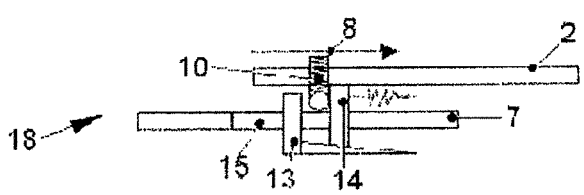

During the further movement of the shift drum 2 in the direction of the arrow 8, the flexible first stop 10 is moved past the second stop, and the first stop 10 relaxes into the space between the second stop 13 and the third stop 14. Owing to the third stop 14 being deployed under the action of the projection 16 of the second stop 13, the first stop 10 cannot pass the third stop 14 (FIG. 6).

Figure 7:
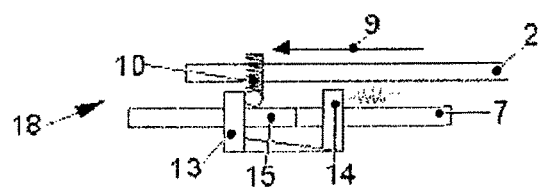

Therefore, the shift drum 2 is rotated backwards slightly in the opposite direction as per arrow 9, wherein the first stop moves the second stop backward until the latter assumes a position at the end of the guide slot 15. Since, in said position, the relatively thin end of the projection 16 is arranged in the region of the third stop 14, said third stop is moved backward into the retracted position under the action of the spring that is not shown (FIG. 7).

Figure 8:
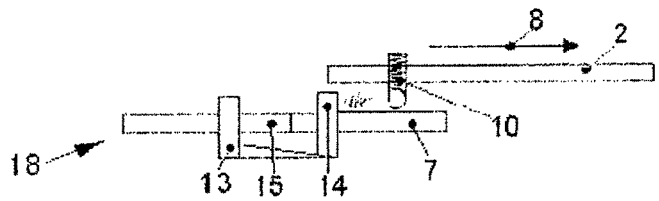
Figure 9:
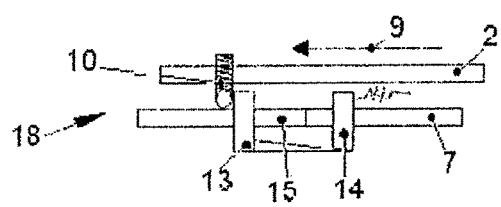
FIG. 9 shows the initial position of the shift drum as per FIG. 3 proceeding from the parking lock position of the shift drum as per FIG. 8, thus with the first transmission ratio engaged.

In order to attain the parking lock position of the shift drum 2, said shift drum is moved in the opposite direction again, that is to say in the direction of the arrow 8, wherein the first stop 10 that is situated between the second stop 13 and the third stop 14 can then be moved over the retracted third stop correspondingly to the movement over the third stop 13 as per FIG. 3. FIG. 8 shows the parking lock position of the shift drum 2, in which the first stop 10 assumes a position far behind the third stop 14 in relation to the direction of the arrow 8.

The shift drum 2 can be easily returned from its parking lock position into the position of the first transmission ratio. It is merely necessary, proceeding from the parking lock position of the shift drum 2 as per FIG. 8, for the shift drum 2 to be moved backward in the direction of the arrow 9, wherein the flexible first stop 10 can however be moved past the third stop 14 and then past the second stop 13 as illustrated in FIG. 3, but in the opposite direction.

Thus, a mechanical apparatus 18 is proposed which, in a manner dependent on the movement direction or direction of rotation of the shift drum 2, initially prevents the selection of a certain shift drum position by way of a positively locking blockage, which can be activated by virtue of a certain position being passed over. A release of the shift drum 2 for the purposes of attaining the initially blocked position is realized in that the shift drum 2 must initially be moved backward from the blocked position through a certain travel or angle, and in the process, releases the locking action again by way of a passing-over action.

The apparatus 18 that serves for limiting the travel of the shift drum 2 permits an activation of the parking lock only after enablement. Here, engagement is performed in particular into an additional shift drum track.

LIST OF REFERENCE DESIGNATIONS

1 Axis
2 Shift drum
3 Slotted guide
4 Slotted guide
5 Shift pin
6 Shift pin
7 Static part
8 Arrow
9 Arrow
10 First stop
11 Spiral spring
12 Stop ball
13 Second stop
14 Third stop
15 Guide slot
16 Projection
17 Surface
18 Apparatus
19 Spacing dimension

What is claimed is:

1. A device for preventing inadvertent selection of a parking lock function in a 2-ratio transmission, wherein shift positions of the transmission and the parking lock function of said transmission are configured to be selected by way of a shift drum,
    wherein a mechanically acting apparatus which, in the event of rotation of the shift drum in a first direction of rotation, blocks the selection of a parking lock position of the shift drum, subsequently, in the event of rotation of the shift drum in a second direction of rotation opposite to the first direction of rotation, the mechanically acting apparatus releases the blocking, and subsequently, in the first direction of rotation opposite to the second direction of rotation, permits selection of the parking lock position.

2. The device as claimed in claim 1, wherein the mechanically acting apparatus blocks the selection of the parking lock position of the shift drum in a positively locking fashion.

3. The device as claimed in claim 1, wherein the shift drum is rotated backward in the second direction of rotation by an angle of rotation which is smaller than an angle of rotation for attaining a shift position of the transmission.

4. The device as claimed in claim 1, wherein the mechanically acting apparatus has a first base part and a second base part which are movable relative to one another, a flexible first stop which is mounted in the first base part, and second and third stops which are mounted in the second base part, wherein the second stop is mounted in the second base part so as to be displaceable to a limited extent in the directions of relative movement of the base parts, and the third stop is displaceable, perpendicularly to the directions of relative movement of the base parts, in the direction of the first base part and oppositely thereto, wherein, in the event of relative movement of the two base parts, the second stop is moved to a limited extent by way of by the first stop, and in the process, the third stop is deployed in the direction of the first base part, in such a way that, after limited movement of the second stop in the direction of the third stop, in the event of a further relative movement of the two base parts, the second stop is passed over by the first stop, and the third stop cannot be passed over by the first stop.

5. The device as claimed in claim 4, wherein the second stop has a projection which, during the movement of the second stop in the direction of the third stop, deploys the third stop in the direction of the first base part.

6. The device as claimed in claim 4, wherein a spring is configured to preload the third stop into a retracted position.

7. The device as claimed in claim 4, wherein the first stop, when arranged between the second stop and third stop and in the event of a movement of the first stop and the second stop toward one another, pushes the second stop back to a limited extent, and the second stop releases the third stop, whereby the third stop retracts.

8. The device as claimed in claim 7, wherein, when the second stop has been pushed back and the third stop is retracted, the third stop is configured to be passed over by the first stop for the purposes of attaining the parking lock position of the shift drum.

9. The device as claimed in claim 7, wherein, proceeding from the parking lock position of the shift drum, the retracted third stop and the second stop are configured to be passed over by the first stop for the purposes of attaining a shift position of the transmission.

10. The device as claimed in claim 7, wherein, proceeding from the parking lock position of the shift drum, the retracted third stop and the second stop are configured to be passed over by the first stop for the purposes of attaining a shift position of a first transmission ratio of the transmission.

11. The device as claimed in claim 4, wherein the first base part is a constituent part of the shift drum or is connected rotationally conjointly to the shift drum, and the second base part is static.

12. The device as claimed in claim 1, wherein the two transmission ratios are configured to be shifted by way of one clutch and one shift claw.

13. The device as claimed in claim 12, wherein, in a first transmission ratio of the transmission, the clutch is open and the shift claw is closed, in a second transmission ratio of the transmission, the clutch is closed and the shift claw is open, and in the parking lock function of the transmission, the clutch and the shift claw are closed.

14. The device as claimed in claim 1, wherein the shift drum is rotated backward in the second direction of rotation by an angle of rotation which is smaller than an angle of rotation for attaining a shift position of the first transmission ratio.

15. A method for preventing inadvertent selection of a parking lock function in a 2-ratio transmission, wherein shift positions of the transmission and the parking lock function of said transmission are configured to be selected by way of a shift drum, the method comprising the steps of:

blocking a selection of a parking lock position of the shift drum in the event of rotation of the shift drum in a first direction of rotation, subsequently releasing the blocking in the event of rotation of the shift drum in a second direction of rotation opposite to the first direction of rotation, and subsequently permitting the selection of the parking lock position in the event of rotation of the shift drum in the first direction of rotation opposite to the second direction of rotation.

\* \* \* \* \*